(12) United States Patent
Moody et al.

(10) Patent No.: US 9,888,086 B1
(45) Date of Patent: Feb. 6, 2018

(54) PROVIDING ASSOCIATION RECOMMENDATIONS TO USERS

(71) Applicant: Google Inc., Mountain View, CA (US)

(72) Inventors: Paul Moody, Mountain View, CA (US); Stephen Paul Farrell, San Francisco, CA (US); Rowan Nairn, San Francisco, CA (US)

(73) Assignee: Google LLC, Mountain View, CA (US)

( * ) Notice: Subject to any disclaimer, the term of this patent is extended or adjusted under 35 U.S.C. 154(b) by 510 days.

(21) Appl. No.: 13/842,615

(22) Filed: Mar. 15, 2013

(51) Int. Cl.
*G06F 15/16* (2006.01)
*H04L 29/08* (2006.01)
*H04L 12/58* (2006.01)
*G06Q 50/00* (2012.01)

(52) U.S. Cl.
CPC .............. *H04L 67/22* (2013.01); *H04L 51/16* (2013.01); *G06Q 50/01* (2013.01)

(58) Field of Classification Search
CPC .............. H04L 65/4084; H04L 65/403; H04L 63/0428; H04L 63/08; H04L 63/104; G06Q 10/06; G06Q 10/10; G06Q 50/01; G06F 17/30867; G06F 15/16; G06F 9/4443; G06F 17/28; G06F 17/30861; H04M 1/7253; H04W 12/06
USPC ........ 709/204, 206, 217, 227, 231; 715/736, 715/753, 863
See application file for complete search history.

(56) References Cited

U.S. PATENT DOCUMENTS

| 6,847,969 | B1* | 1/2005 | Mathai | G06Q 30/02 |
| 8,122,031 | B1* | 2/2012 | Mauro | G06F 17/3071 |
| | | | | 707/727 |
| 8,850,031 | B2* | 9/2014 | Oshiba | 709/227 |
| 8,935,422 | B1* | 1/2015 | Terleski et al. | 709/231 |
| 2006/0047666 | A1* | 3/2006 | Bedi | G06F 17/3089 |
| 2006/0218140 | A1* | 9/2006 | Whitney | G06F 17/3069 |
| 2007/0219794 | A1* | 9/2007 | Park | G06Q 10/10 |
| | | | | 704/246 |
| 2008/0133488 | A1* | 6/2008 | Bandaru | G06F 17/2785 |
| 2008/0133541 | A1* | 6/2008 | Fletcher et al. | 707/10 |
| 2009/0228563 | A1* | 9/2009 | Jones et al. | 709/206 |
| 2012/0173626 | A1* | 7/2012 | Reis et al. | 709/204 |
| 2012/0179981 | A1* | 7/2012 | Whalin | G06Q 10/10 |
| | | | | 715/753 |
| 2013/0054709 | A1* | 2/2013 | Sabur | 709/206 |
| 2013/0166565 | A1* | 6/2013 | Lepsoe | G06F 17/30873 |
| | | | | 707/740 |
| 2014/0059443 | A1* | 2/2014 | Tabe | H04L 51/32 |
| | | | | 715/738 |
| 2014/0068692 | A1* | 3/2014 | Archibong et al. | 725/116 |

\* cited by examiner

*Primary Examiner* — Dhairya A Patel
(74) *Attorney, Agent, or Firm* — Patent Law Works LLP

(57) ABSTRACT

The disclosure includes a system and method for providing an association recommendation to a user. The system includes a processor and a memory storing instructions that when executed cause the system to: receive a request to disassociate with a first topic from a first user; identify one or more labels and one or more refined topics associated with the first topic; determine a second user that shares one or more second topics in common with the first user; retrieve social graph data describing a social graph associated with the second user; and determine, based on the social graph data associated with the second user, an association recommendation relevant to the first user from the one or more labels and the one or more refined topics.

11 Claims, 10 Drawing Sheets

Unsubscribe from the topic Rock Music?

Unsubscribe

If you are no longer interested in Rock Music, we suggest you to unsubscribe from the topic. However, if you are unsubscribing because there were too many posts that were off-topic, you might want to switch your subscription to a more precise #tag.

tags associated with Rock Music

☐ #rock music before 80s
☐ #rock music in 80s
☐ #rock music in 90s
☐ #rock music after 90s
☐ #rock music from Europe
☐ #rock music from US Adjust your subscriptions by removing Rock Music and adding the selected #tags.

Adjust subscriptions  Cancel

Unsubscribe from the topic Rock Music?

Unsubscribe

If you are no longer interested in Rock Music, we suggest you to unsubscribe from the topic. However, if you are unsubscribing because there were too many posts that were off-topic, you might want to switch your subscription to a more precise topic.

More precise topics than Rock Music
- ☐ Punk
- ☐ Hardcore punk
- ☐ Heavy metal
- ☐ New wave of American heavy metal
- ☐ New wave of British heavy metal
- ☐ Rock and roll Adjust your subscriptions by removing Rock Music and adding the selected topics.

Adjust subscriptions   Cancel

540

Figure 5C

PROVIDING ASSOCIATION RECOMMENDATIONS TO USERS

BACKGROUND

The specification relates to recommending content to users.

A user may subscribe to a topic and receive content related to the topic via a content feed. However, a content feed related to a general and vague topic may include noisy results with various off-topic items. If the user selects to unsubscribe from the topic, items (including on-topic items and off-topic items) in the content feed will be removed for the user even though the user may be interested in the on-topic items.

SUMMARY

According to one innovative aspect of the subject matter described in this disclosure, a system for providing association recommendations to users includes a processor and a memory storing instructions that, when executed, cause the system to: receive a request to disassociate with a first topic from a first user; identify one or more labels and one or more refined topics associated with the first topic; determine a second user that shares one or more second topics in common with the first user; retrieve social graph data describing a social graph associated with the second user; and determine, based on the social graph data associated with the second user, an association recommendation relevant to the first user from the one or more labels and the one or more refined topics.

In general, another innovative aspect of the subject matter described in this disclosure may be embodied in methods that include: receiving a request to disassociate with a first topic from a first user; identifying one or more labels and one or more refined topics associated with the first topic; determining a second user that shares one or more second topics in common with the first user; retrieving social graph data describing a social graph associated with the second user; and determining, based on the social graph data associated with the second user, an association recommendation relevant to the first user from the one or more labels and the one or more refined topics.

Other aspects include corresponding methods, systems, apparatus, and computer program products for these and other innovative aspects.

These and other implementations may each optionally include one or more of the following features. For instance, the operations include: determining a topic structure that includes the one or more labels, the one or more refined topics, one or more keywords, one or more confidence scores for the one or more labels and one or more links to one or more associated objects; identifying one or more entity representations associated with the first topic; receiving data describing a selection of the association recommendation from the first user; and creating an association between the first user and the association recommendation.

For instance, the features include: the association recommendation is determined based on the topic structure; the topic structure includes the one or more entity representations; the first user and the second user are connected in a topic-interest graph; determining an association pattern related to the first topic based on the social graph data; determining the association recommendation based on the association pattern; determining a preliminary set of association recommendations based on the social graph data; and determining the association recommendation from the preliminary set of association recommendations.

The present disclosure may be particularly advantageous in a number of respects. First, the system can provide one or more association recommendations to a user that requests to disassociate with a topic. The user can be provided with one or more alternative topics (e.g., refined topics, peer topics, etc.), labels or communities from a topic structure associated with the topic. Second, the system can identify an association pattern related to the topic and determine one or more association recommendations based on the association pattern. The system may also have other numerous advantages.

BRIEF DESCRIPTION OF THE DRAWINGS

The disclosure is illustrated by way of example, and not by way of limitation in the figures of the accompanying drawings in which like reference numerals are used to refer to similar elements.

FIGS. 5A-5D are graphic representations of example user interfaces for providing an association recommendation to a user.

DETAILED DESCRIPTION

Figure 1:
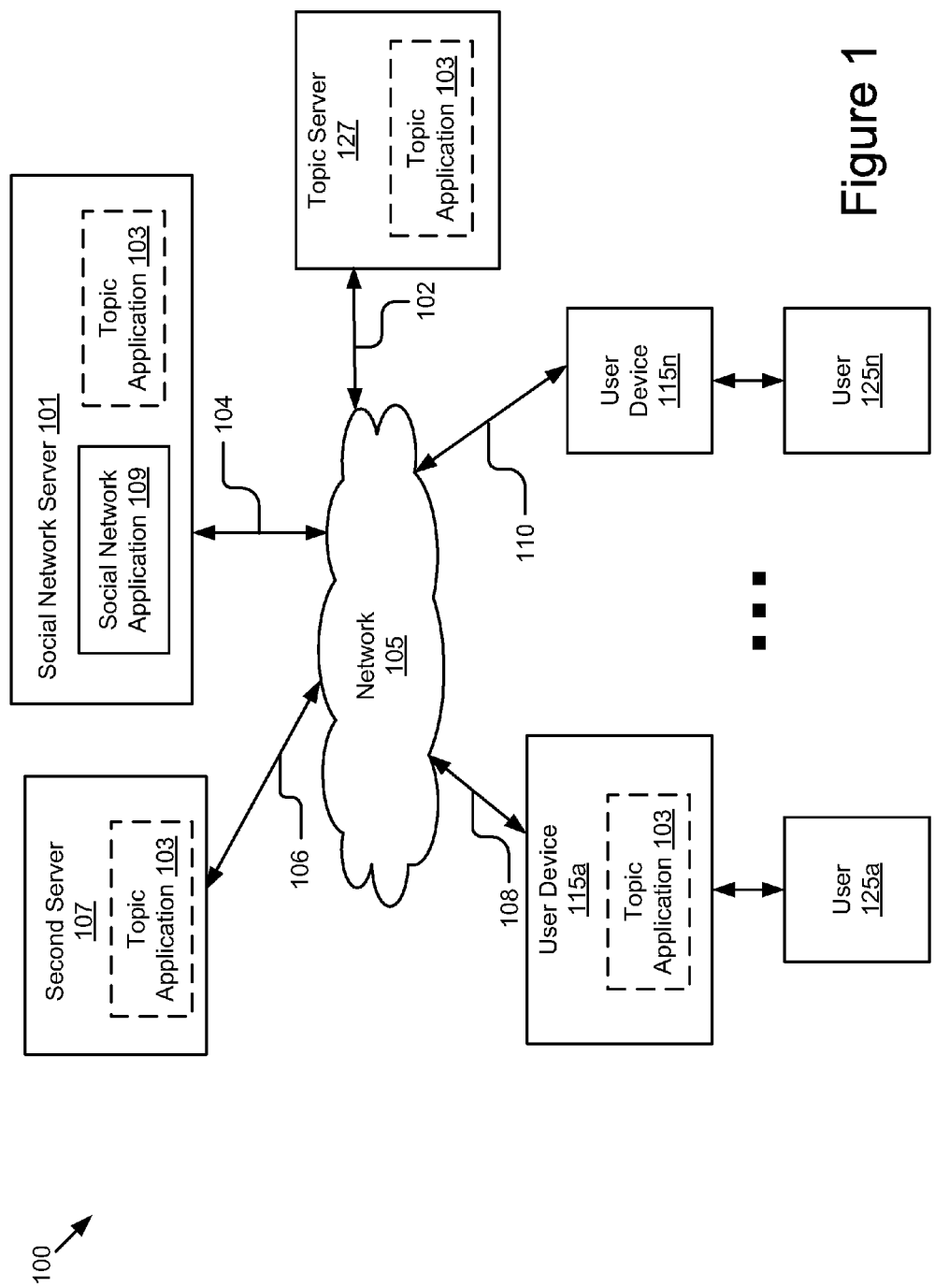
FIG. 1 is a block diagram illustrating an example system for providing an association recommendation to a user.

FIG. 1 illustrates a block diagram of some implementations of a system 100 for providing an association recommendation to a user. The illustrated system 100 includes user devices 115a . . . 115n that can be accessed by users 125a . . . 125n, a social network server 101, a second server 107 and a topic server 127. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number. In the illustrated implementation, these entities of the system 100 are communicatively coupled via a network 105.

The user devices 115a, 115n in FIG. 1 are used by way of example. While FIG. 1 illustrates two user devices 115a and 115n, the present disclosure applies to a system architecture having one or more user devices 115. Furthermore, although FIG. 1 illustrates one network 105 coupled to the user devices 115, the social network server 101, the second server 107 and the topic server 127, in practice one or more networks 105 can be connected to these entities.

In some implementations, the topic application 103 can be operable on the social network server 101, which is coupled to the network 105 via signal line 104. The social network server 101 can be a hardware server that includes a processor, a memory and network communication capabilities. In some implementations, the social network server 101 sends and receives data to and from one or more of the user devices 115a, 115n, the topic server 127 and the second server 107 via the network 105. The social network server 101 includes a social network application 109. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related. Furthermore, the social network server 101 and the social network application 109 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

In some implementations, the topic application 103 can be stored on a second server 107, which is connected to the network 105 via signal line 106. In some implementations, the second server 107 can be a hardware server that includes a processor, a memory and network communication capabilities. The second server 107 sends and receives data to and from other entities of the system 100 via the network 105. While FIG. 1 includes one second server 107, the system 100 may include one or more second servers 107.

In some implementations, the topic application 103 can be stored on a topic server 127, which is connected to the network 105 via signal line 102. In some implementations, the topic server 127 can be a hardware server that includes a processor, a memory and network communication capabilities. The topic server 127 sends and receives data to and from other entities of the system 100 via the network 105. While FIG. 1 includes one topic server 127, the system 100 may include one or more topic servers 127.

In some implementations, the topic application 103 can be stored on a user device 115a, which is connected to the network 105 via signal line 108. In some implementations, the user device 115a, 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated implementation, the user 125a interacts with the user device 115a. The user device 115n is communicatively coupled to the network 105 via signal line 110. The user 125n interacts with the user device 115n. In some implementations, the topic application 103 acts in part as a thin-client application that may be stored on the user devices 115a, 115n and in part as components that may be stored on one or more of the social network server 101, the topic server 127 and the second server 107.

The topic application 103 can be code and routines for providing an association recommendation to a user. In some implementations, the topic application 103 can be implemented using hardware including a field-programmable gate array (FPGA) or an application-specific integrated circuit (ASIC). In some other implementations, the topic application 103 can be implemented using a combination of hardware and software. In some implementations, the topic application 103 may be stored in a combination of the devices and servers, or in one of the devices or servers. The topic application 103 is described below in more detail with reference to FIGS. 2-4B.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, email, etc.

Figure 2:
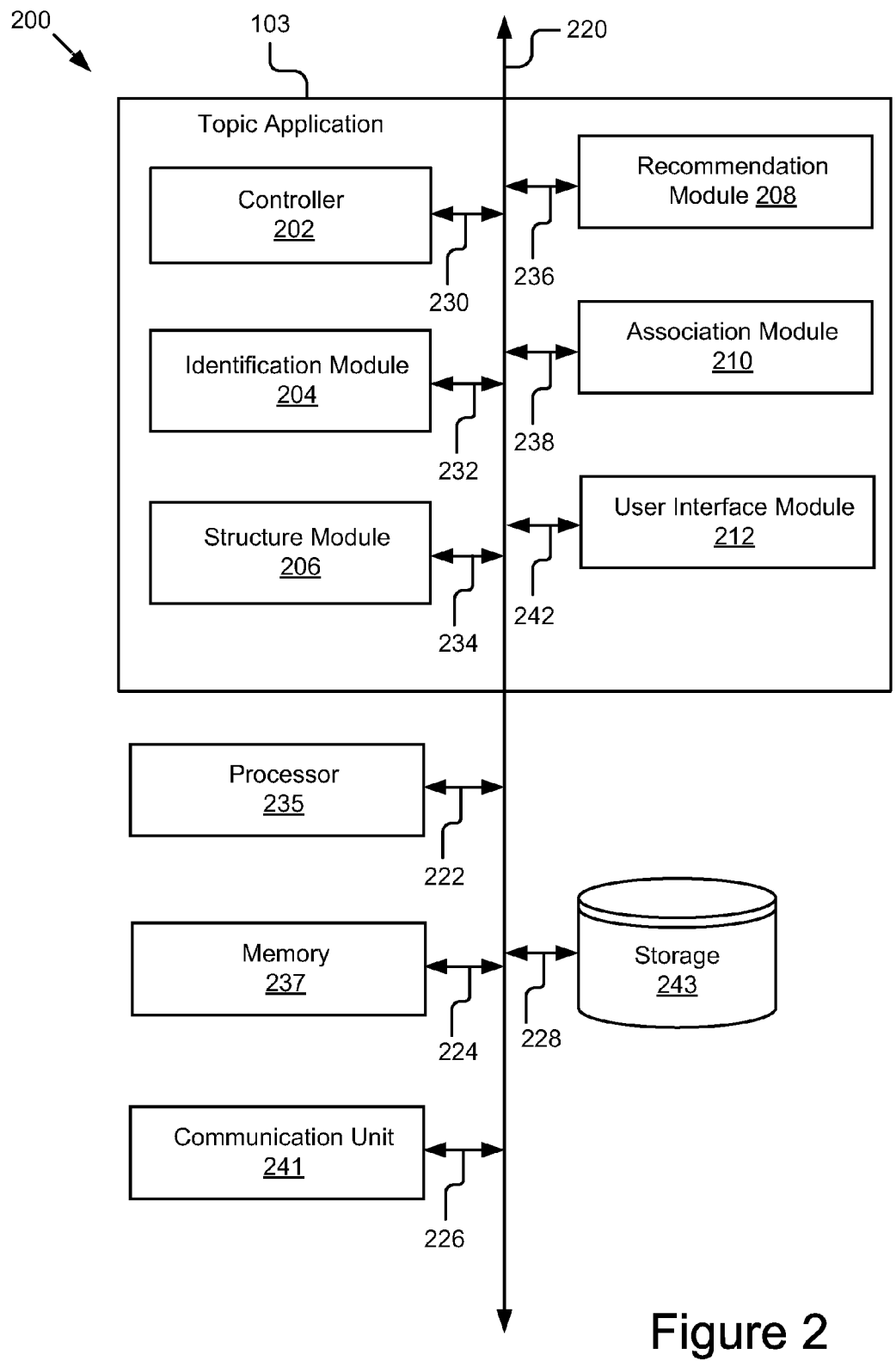
FIG. 2 is a block diagram illustrating an example of a topic application.

Referring now to FIG. 2, an example of the topic application 103 is shown in more detail. FIG. 2 is a block diagram of a computing device 200 that includes a topic application 103, a processor 235, a memory 237, a communication unit 241 and a storage device 243 according to some examples. The components of the computing device 200 are communicatively coupled by a bus 220. In some implementations, the computing device 200 can be one of a social network server 101, a user device 115, a topic server 127 and a second server 107.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the second server 107, the topic server 127 and the social network server 101 depending upon where the topic application 103 may be stored. The communication unit 241 is coupled to the bus 220 via signal line 226. In some implementations, the communication unit 241 includes a port for direct physical connection to the network 105 or to another communication channel. For example, the communication unit 241 includes a USB, SD, CAT-5 or similar port for wired communication with the user device 115. In some implementations, the communication unit 241 includes a wireless transceiver for exchanging data with the user device 115 or other communication channels using one or more wireless communication methods, including IEEE 802.11, IEEE 802.16, BLUETOOTH® or another suitable wireless communication method.

In some implementations, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some implementations, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 243 can be a non-transitory memory that stores data for providing the functionality described herein. The storage device 243 may be a dynamic random access memory (DRAM) device, a static random access memory (SRAM) device, flash memory or some other memory devices. In some implementations, the storage device 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled to the bus 220 via signal line 228.

In some implementations, the storage device 243 stores one or more of: keywords associated with a topic; entity representations associated with a topic; label data describing one or more labels associated with a topic; a confidence score for each label; a topic structure associated with a topic; an association pattern related to a topic; social graph data associated with one or more users; association recommendations for one or more users; an association between a user and an association recommendation; and a topic-interest graph associated with a user. The data stored in the storage device 243 is described below in more detail. In some implementations, the storage device 243 may store other data for providing the functionality described herein.

In the illustrated implementation shown in FIG. 2, the topic application 103 includes a controller 202, an identification module 204, a structure module 206, a recommendation module 208, an association module 210 and a user interface module 212. These components of the topic application 103 are communicatively coupled to each other via the bus 220.

The controller 202 can be software including routines for handling communications between the topic application 103 and other components of the computing device 200. In some implementations, the controller 202 can be a set of instructions executable by the processor 235 to provide the functionality described below for handling communications between the topic application 103 and other components of the computing device 200. In some implementations, the controller 202 can be stored in the memory 237 of the computing device 200 and can be accessible and executable by the processor 235. The controller 202 may be adapted for cooperation and communication with the processor 235 and other components of the computing device 200 via signal line 230.

The controller 202 sends and receives data, via the communication unit 241, to and from one or more of a user device 115, a topic server 127, a social network server 101 and a second server 107. For example, the controller 202 receives, via the communication unit 241, data describing an association recommendation selected by a user from a user device 115 and sends the data to the association module 210. In another example, the controller 202 receives graphical data for providing a user interface to a user from the user interface module 212 and sends the graphical data to a user device 115, causing the user device 115 to present the user interface to the user.

In some implementations, the controller 202 receives data from other components of the topic application 103 and stores the data in the storage device 243. For example, the controller 202 receives graphical data from the user interface module 212 and stores the graphical data in the storage device 243. In some implementations, the controller 202 retrieves data from the storage device 243 and sends the retrieved data to other components of the topic application 103. For example, the controller 202 retrieves data describing a topic structure from the storage 243 and sends the data to the recommendation module 208.

The identification module 204 can be software including routines for identifying a topic. In some implementations, the identification module 204 can be a set of instructions executable by the processor 235 to provide the functionality described below for identifying a topic. In some implementations, the identification module 204 can be stored in the memory 237 of the computing device 200 and can be accessible and executable by the processor 235. The identification module 204 may be adapted for cooperation and communication with the processor 235 and other components of the computing device 200 via signal line 232.

In some implementations, the identification module 204 receives, via the controller 202 and the communication unit 241, a disassociation request from a user device 115 operated by a user. A disassociation request is a request to disassociate with a topic. For example, a disassociation request indicates that a user requests to unsubscribe from a topic. In some implementations, a topic can be a representation of a collection of one or more keywords, one or more entity representations in a knowledge graph and one or more labels.

A label can be description data added to a content item. For example, a label can be data attached to a post, a picture, a video, an article, etc. In another example, a label can be a tag (e.g., a hash tag) attached to a post or a topic. In some implementations, a label can be associated with a confidence score. A confidence score for a label can be data describing a confidence of an association between the label and a topic. For example, a confidence score describes a probability that a label may be associated with a topic.

A knowledge graph can be data describing one or more objects and connections between the one or more objects. Examples of an object in a knowledge graph include, but are not limited to, a person, a topic, an article, a device, a location, an entity or an item of interest. In some implementations, a knowledge graph includes data describing various objects and connections between the various objects that represent various relationships between the various objects. For example, a knowledge graph includes an object "Isaac Newton" and data associated with the object "Isaac Newton" (e.g., date of birth, residence, nationality, occupation, contributions, etc.). The knowledge graph connects the object "Isaac Newton" to another object "Albert Einstein" because both objects represent famous physicists. The knowledge graph also connects the object "Isaac Newton" to a third object "the universal law of gravitation" because Isaac Newton made contributions to the discovery of the universal law of gravitation. The knowledge graph may also connect the object "Isaac Newton" to various other objects.

An entity representation can be data describing one or more characteristics or properties of an object in a knowledge graph. For example, an entity representation can be data describing one or more characteristics of a topic in a knowledge graph. For example, entity representations describing a topic "headphones" may include, but are not limited to, "an audio device," "portable," "speaker," "a wearing style: over the head," "a price range" and "a brand name XYZ," etc. In some implementations, the one or more entity representations can be one or more objects in the knowledge graph connected to the topic and can be used to represent the topic. For example, objects "a brand name XYZ," "a price range between $50 and $100," "a portable speaker" and "a wearing style: in-ear" can be connected to the topic "headphones" in the knowledge graph and represent various properties of the topic "headphones."

Responsive to receiving a disassociation request from a user, the identification module 204 identifies a topic that the user requests to disassociate with. For example, the identification module 204 identifies the topic by performing one or more of: identifying one or more keywords associated with the topic; identifying one or more entity representations associated with the topic in the knowledge graph; identifying label data describing one or more labels associated with the topic; and determining one or more confidence scores for the one or more labels. The determination of labels associated with a topic and the determination of a confidence score for each label are described below in more detail. In some implementations, the identification module 204 may perform other operations to identify the topic.

In some implementations, the identification module 204 retrieves data describing content items associated with the topic from the storage 243. In some other implementations, the identification module 204 receives data describing content items associated with the topic from one or more servers (e.g., the social network server 101, the topic server 127, etc.). The identification module 204 parses the content items to determine a set of estimated labels and a set of existing labels from the content items. An existing label can be a label already included in a content item. For example, an existing label can be a tag (e.g., a hash tag) that a user marks in the content item using a prefix symbol "#." An estimated label can be a label estimated from a content item. For example, an estimated label can be a label estimated by the identification module 204 from a content item but not marked in the content item. In some examples, an existing label marked in a first content item can be an estimated label estimated from a second content item; an estimated label estimated from a third content item can be an existing label marked in a fourth content item.

The identification module 204 determines an occurrence pattern for each existing label and an occurrence pattern for each estimated label. An occurrence pattern can be data describing occurrences of repeated associations between a topic and a label. For example, an occurrence pattern of an existing label describes a count of repeated associations between a topic and the existing label (e.g., if 10 content items related to the topic are marked with the existing label, the count of repeated associations between the topic and the existing label can be 10). In another example, an occurrence pattern of an estimated label describes a count of repeated associations between the topic and the estimated label (e.g., if 20 content items related to the topic are estimated to be associated with the estimated label, the count of repeated associations between the topic and the estimated label can be 20). The identification module 204 determines (1) a count of repeated associations between the topic and each exiting label and (2) a count of repeated associations between the topic and each estimated label based on the content items. For example, the identification module 204 determines (1) a number of times that each existing label appears in the content items and (2) a number of times that each estimated label can be estimated from the content items.

In some instances, the identification module 204 identifies one or more labels associated with the topic as one or more exiting labels and/or estimated labels, each having a count of repeated associations greater than a predetermined threshold. In some other instances, the identification module 204 identifies one or more labels associated with the topic as one or more estimated labels and/or existing labels that have the highest counts of repeated associations with the topic. In yet some other instances, the identification module 204 compares the set of estimated labels to the set of existing labels, and identifies one or more labels associated with the topic as common labels present in both the set of existing labels and the set of estimated labels. In some examples, each identified common label also has a total count of repeated associations greater than a predetermined threshold.

The identification module 204 determines a confidence score for each identified label associated with the topic. For example, the identification module 204 determines a confidence score for a label based on an occurrence pattern related to the label, so that a first label related to a higher count of repeated associations has a higher confidence score than a second label related to a smaller count of repeated associations. In another example, the identification module 204 determines a confidence score for a label based on a type of the label, so that an existing label marked by users in the content items has a higher confidence score than an estimated label. For example, a tag marked by users in the content items has a higher confidence score than an estimated tag not marked in the content items. In another example, a first estimated label estimated from the content items may be also an existing label marked in the content items. In other words, the first estimated label can be a common label between the set of estimated labels and the set of existing labels. The first estimated label has a higher confidence score than a second estimated label that is not a common label.

In some implementations, the identification module 204 sends data describing one or more of keywords, entity representations, identified labels associated with the topic and confidence scores for the identified labels to the structure module 206. In some other implementations, the identification module 204 stores the data describing one or more of keywords, entity representations, identified labels associated with the topic and confidence scores for the identified labels in the storage device 243.

The structure module 206 can be software including routines for determining a topic structure. In some implementations, the structure module 206 can be a set of instructions executable by the processor 235 to provide the functionality described below for determining a topic structure. In some implementations, the structure module 206 can be stored in the memory 237 of the computing device 200 and can be accessible and executable by the processor 235. The structure module 206 may be adapted for cooperation and communication with the processor 235 and other components of the computing device 200 via signal line 234.

In some implementations, the structure module 206 receives data describing one or more keywords, one or more entity representations, one or more labels and one or more confidence scores for the one or more labels from the identification module 204. The structure module 206 determines a topic structure using the received data. A topic structure can be data describing a topic. For example, a topic structure for a topic can be a topic hierarchy including one or more parent topics, child topics, peer topics, refined topics, labels, communities, etc., associated with the topic. In some implementations, a topic structure for a topic includes one or more data entries (e.g., one or more keywords, one or more entity representations, label data describing one or more labels, a confidence score for each label, one or more communities associated with the topic, etc.) and one or more links to one or more associated objects.

In some implementations, a community associated with a topic can be a group of users associated with the topic. For example, a community associated with a topic includes a group of users that subscribe to the topic. In some implementations, a community associated with a topic can be an online forum focusing on the topic.

Figure 6:
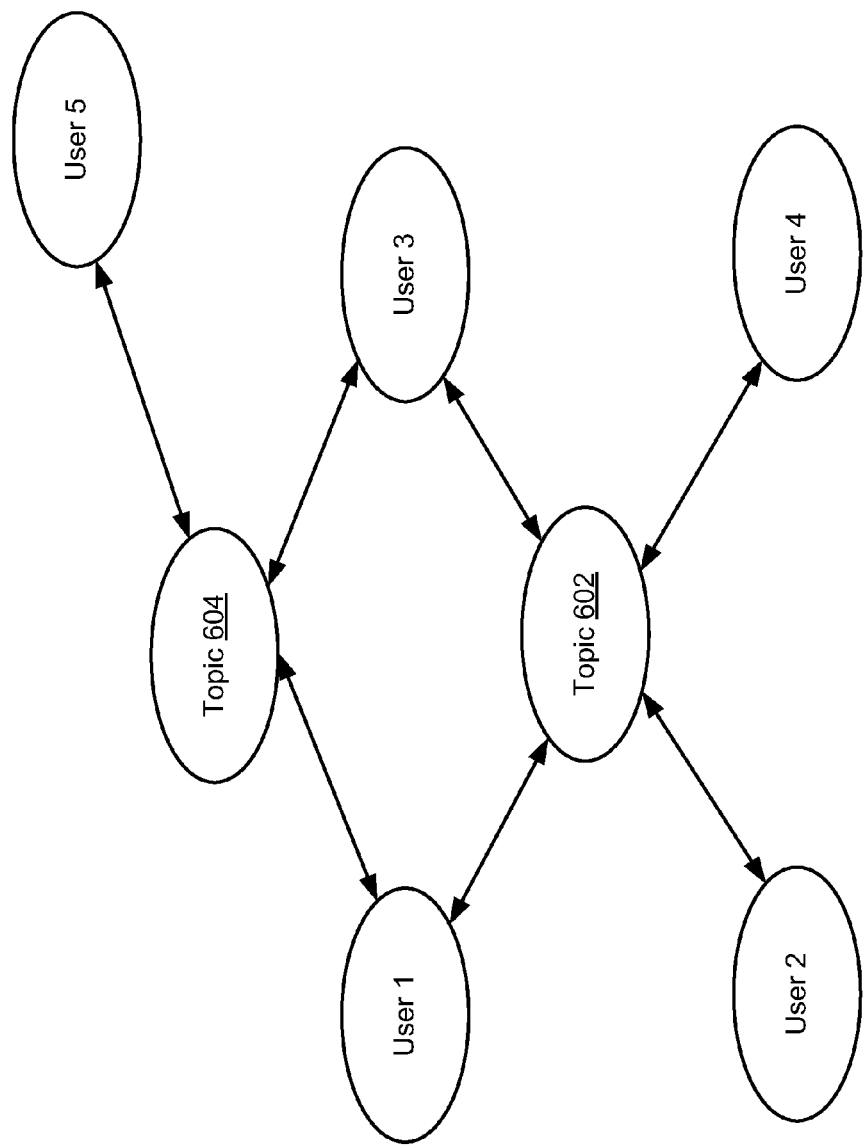
FIG. 6 is a graphic representation of an example user interface illustrating an example topic-interest graph.

Example links to one or more associated objects in a topic structure include, but are not limited to, a link to a database describing users associated with the topic (e.g., a pointer to a table listing users subscribing to the topic), a link to posts associated with the topic published in a social network (e.g., a link to red-hot posts associated with the topic), a link to a community associated with the topic, a link to events associated with the topic, a link to multi-user communication sessions associated with the topic and a link to a topic-interest graph including the topic, etc. A topic-interest graph can be data describing relationships between one or more users that form connections via one or more common topics. For example, a topic-interest graph describes connections between one or more users that share a topic as a common interest. An example topic-interest graph is illustrated in FIG. 6.

In some implementations, the structure module 206 sends data describing the topic structure associated with the topic to the recommendation module 208. In some other implementations, the structure module 206 stores the data describing the topic structure in the storage device 243.

The recommendation module 208 can be software including routines for providing an association recommendation to a user. In some implementations, the recommendation module 208 can be a set of instructions executable by the processor 235 to provide the functionality described below for providing an association recommendation to a user. In some implementations, the recommendation module 208 can be stored in the memory 237 of the computing device 200 and can be accessible and executable by the processor 235. The recommendation module 208 may be adapted for cooperation and communication with the processor 235 and other components of the computing device 200 via signal line 236.

In some implementations, the recommendation module 208 receives data describing a topic structure associated with a first topic from the structure module 206. A first user requests to disassociate with the first topic. For example, the first user requests to unsubscribe from the first topic. The recommendation module 208 determines one or more association recommendations for the first user based on the topic structure. For example, the recommendation module 208 selects one or more second topics (e.g., refined topics, peer topics, child topics), one or more tags and/or one or more communities from the topic structure as association recommendations to the first user. An association recommendation can be data describing a topic association recommended to a user. For example, an association recommendation includes one of a topic (e.g., a child topic, a peer topic, a refined topic, etc.), a label and a community recommended to a user.

In some implementations, the recommendation module 208 retrieves social graph data associated with the first user from a social network server 101 with the consent from the first user. In some examples, the social graph data associated with the first user includes one or more of: (1) data describing associations between the first user and one or more second users connected in a social graph (e.g., friends, family members, colleges, etc.); (2) data describing one or more engagement actions performed by the first user (e.g., endorsements, comments, sharing, posts, reposts, etc.); (3) data describing one or more engagement actions performed by one or more second users connected to the first user in a social graph (e.g., friends's endorsements, comments, posts, etc.) with the consent from the one or more second users; (4) a user profile describing the first user (e.g., gender, interests, hobbies, demographic data, education experience, working experience, etc.); (5) an association history of the first user (e.g., a public topic/tag/community subscription history of the first user); (6) an association history of a second user connected to the first user in a social graph (e.g., a public topic/tag/community subscription history of a friend); (7) a disassociation history of the first user (e.g., a public topic/tag/community unsubscription history of the first user); and (8) a disassociation history of a second user connected to the first user in a social graph (e.g., a public topic/tag/community unsubscription history of a friend). The retrieved social graph data may include other data obtained from the social network server 101 upon the consent from users.

The recommendation module 208 determines a preliminary set of association recommendations for the first user based on the social graph data associated with the first user. For example, the recommendation module 208 determines one or more refined topics, tags and communities associated with the first topic for the first user based on the social graph data. In another example, the recommendation module 208 determines the one or more refined topics, tags and communities for the first user because the first user has performed engagement actions on the one or more refined topics, tags and communities. In yet another example, the recommendation module 208 determines the one or more refined topics, tags and communities for the first user because one or more second users connected to the first user in a social graph have performed engagement actions on the one or more refined topics, tags and communities.

The recommendation module 208 determines one or more association recommendations for the first user from the preliminary set of association recommendations based on the topic structure. For example, the recommendation module 208 filters the preliminary set of association recommendations using the topic structure and determines the one or more association recommendations as one or more topics, tags, communities, etc., included in both the preliminary set of association recommendations and the topic structure.

In some implementations, the recommendation module 208 determines one or more second users associated with one or more data entries in the topic structure. For example, the recommendation module 208 determines one or more second users that subscribe to one or more tags, topics and communities in the topic structure. In some other implementations, the recommendation module 208 determines one or more second users based on a topic-interest graph related to the first user. For example, the recommendation module 208 retrieves, from the storage device 243, data describing a topic-interest graph that connects the first user to other users through one or more common topics. The recommendation module 208 determines one or more second users that share one or more common topics with the first user in the topic-interest graph.

In some examples, the one or more determined second users may also be connected to the first user in the social graph. In some other examples, the one or more second users may not be connected to the first user in the social graph. In some examples, the one or more second users each have a reputation score greater than a predetermined threshold. A reputation score can be data indicating a user's reputation for recommending content to other users. For example, an experienced photographer may have a higher reputation score for recommending a professional camera to other users than a newcomer to photography.

The recommendation module 208 retrieves social graph data related to the one or more second users with the consent from the one or more second users. The recommendation module 208 determines association recommendations for the first user based on the topic structure and the social graph data associated with the one or more second users. For example, the recommendation module 208 determines one or more refined topics, peer topics, tags and/or communities from the topic structure, with the one or more refined topics, peer topics, tags and communities associated with one or more engagement actions performed by the one or more second users (e.g., the one or more refined topics, peer topics, tags and communities being endorsed or shared by the one or more second users).

In some implementations, the recommendation module 208 determines an association pattern related to the first topic. An association pattern related to a topic can be data describing a behavior pattern indicating how users associate or disassociate with the topic. For example, an association pattern related to a first topic describes that 90% of the people that request to disassociate with the first topic select to associate with a second topic (e.g., 90% of the people that unsubscribe from the first topic subscribe to the second topic). In another example, an association pattern related to the first topic describes that more than 80% of the people that associate with the first topic also associate with a second topic (e.g. 80% of the people that subscribe to the first topic also subscribe to the second topic).

In some examples, the recommendation module 208 determines the association pattern for the first topic based on an association history and/or a disassociation history of one or more second users. In some instances, the one or more second users may be connected to the first user in a social graph. For example, the recommendation module 208 determines the association pattern indicating that 2 friends of the first user that unsubscribe from the first topic subscribe to a second topic. In another example, the recommendation module 208 determines the association pattern indicating that 3 friends of the first user that subscribe to the first topic also subscribe to a second topic. In some instances, the one or more second users may be connected to the first user in a topic-interest graph via one or more common topics. For example, the recommendation module 208 determines the association pattern indicating that 10 other users, who share one or more common topics with the first user in the topic-interest graph and unsubscribe from the first topic, subscribe to a second topic. In some other instances, the one or more second users may not be connected to the first user. For example, the recommendation module 208 determines the association pattern indicating that 60% of the people that unsubscribe from the first topic subscribe to a second topic.

The recommendation module 208 determines one or more association recommendations based on the topic structure and the association pattern. For example, assume the association pattern related to the first topic indicates that: (1) 3 friends of the first user that subscribe to the first topic also subscribe to a first label; (2) 2 friends of the first user that unsubscribe to the first topic select to subscribe to a first community; and (3) 60% of the people that unsubscribe from the first topic select to subscribe to a second topic. The recommendation module 208 determines the association recommendations for the first user that include the first label, the first community and the second topic. In some instances, the recommendation module 208 determines one or more second labels that match the first label from the topic structure, one or more second communities that match the first community from the topic structure and one or more other topics that match the second topic from the topic structure. The recommendation module 208 generates the association recommendations for the first user including the one or more second labels, the one or more second communities and the one or more other topics from the topic structure.

In some implementations, the recommendation module 208 provides the one or more association recommendations to the first user. For example, the recommendation module 208 instructs the user interface module 212 to generate graphical data for providing a user interface that depicts the one or more association recommendations to the first user. In some other implementations, the recommendation module 208 stores data describing the one or more association recommendations in the storage device 243.

The association module 210 can be software including routines for creating an association between a user and an association recommendation. In some implementations, the association module 210 can be a set of instructions executable by the processor 235 to provide the functionality described below for creating an association between a user and an association recommendation. In some implementations, the association module 210 can be stored in the memory 237 of the computing device 200 and can be accessible and executable by the processor 235. The association module 210 may be adapted for cooperation and communication with the processor 235 and other components of the computing device 200 via signal line 238.

In some implementations, the association module 210 receives data describing an association recommendation selected by a user via the controller 202 and associates the user with the selected association recommendation. For example, the association module 210 receives data indicating the user selects to subscribe to one or more of a topic, a tag and a community presented to the user via a user interface. The association module 210 creates an association between the user and each of the select topic, the selected tag and the selected community. The association module 210 stores data describing the associations in the storage device 243.

The user interface module 212 can be software including routines for generating graphical data for providing user interfaces to users. In some implementations, the user interface module 212 can be a set of instructions executable by the processor 235 to provide the functionality described below for generating graphical data for providing user interfaces to users. In some implementations, the user interface module 212 can be stored in the memory 237 of the computing device 200 and can be accessible and executable by the processor 235. The user interface module 212 may be adapted for cooperation and communication with the processor 235 and other components of the computing device 200 via signal line 242.

In some implementations, the user interface module 212 generates graphical data for providing a user interface that present an association recommendation to a user. The user interface module 212 sends the graphical data to a user device 115, causing the user device 115 to present the user interface to the user. Example user interfaces are shown in FIGS. 5A-5D. The user interface module 212 may generate graphical data for providing other user interfaces to users.

Figure 3:
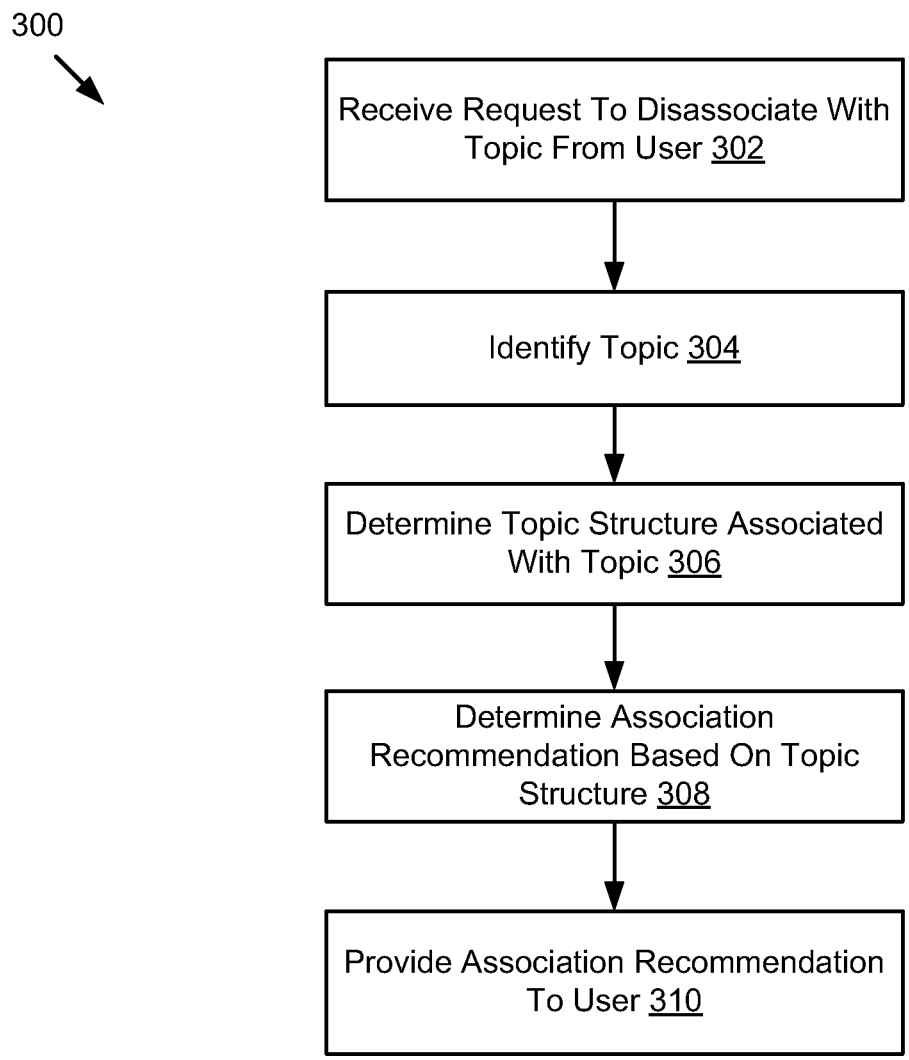
FIG. 3 is a flowchart of an example method for providing an association recommendation to a user.

FIG. 3 is a flowchart of an example method 300 for providing one or more association recommendations to a user. In some implementations, the controller 202 receives 302 a request to disassociate with a topic from a user. The identification module 204 identifies 304 the topic. The structure module 206 determines 306 a topic structure associated with the topic. The recommendation module 208 determines 308 one or more association recommendations based on the topic structure. The recommendation module 208 provides 310 the one or more association recommendations to the user.

Figure 4A:
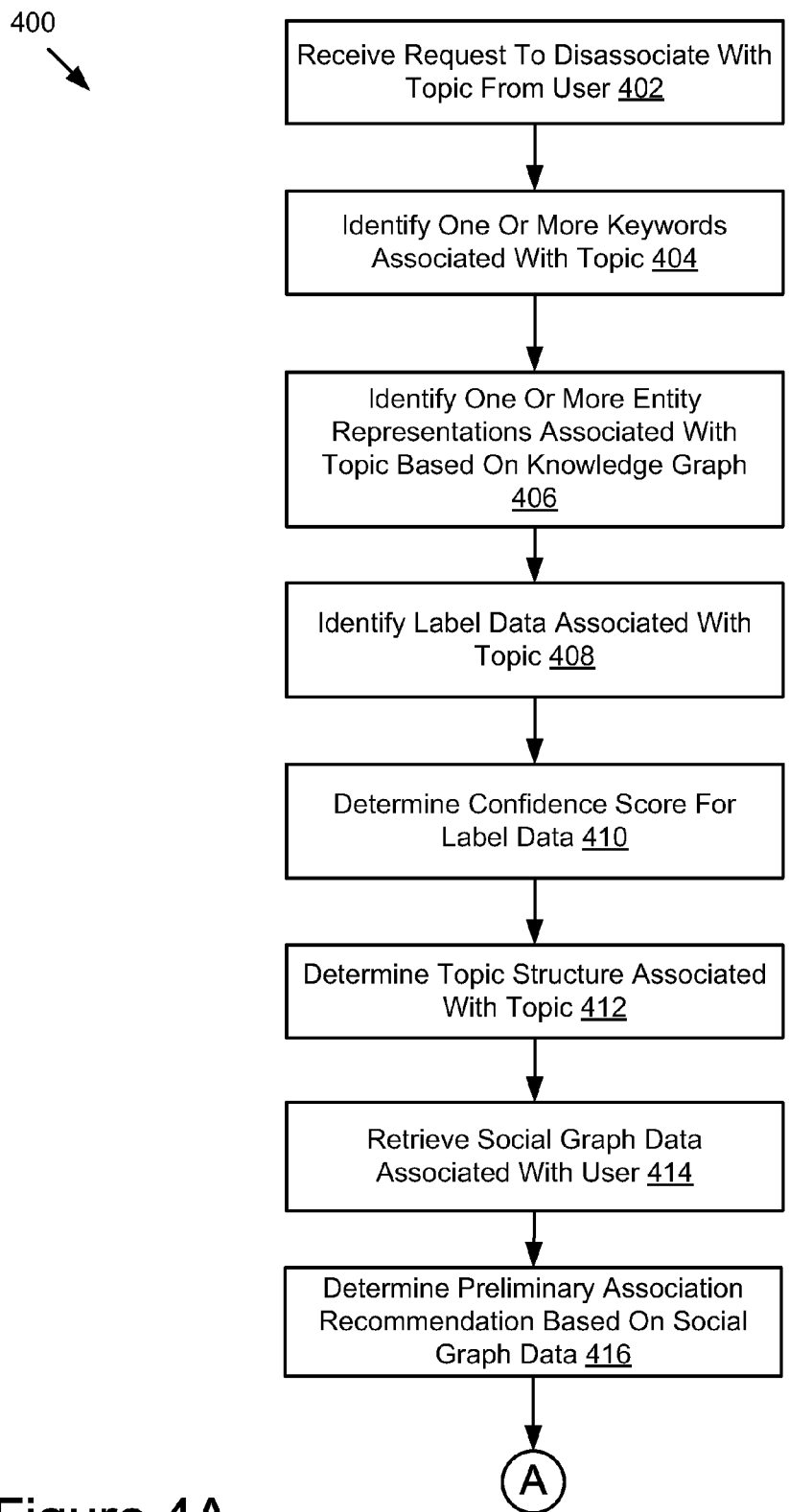
FIGS. 4A and 4B are flowcharts of another example method for providing an association recommendation to a user.
Figure 4B:
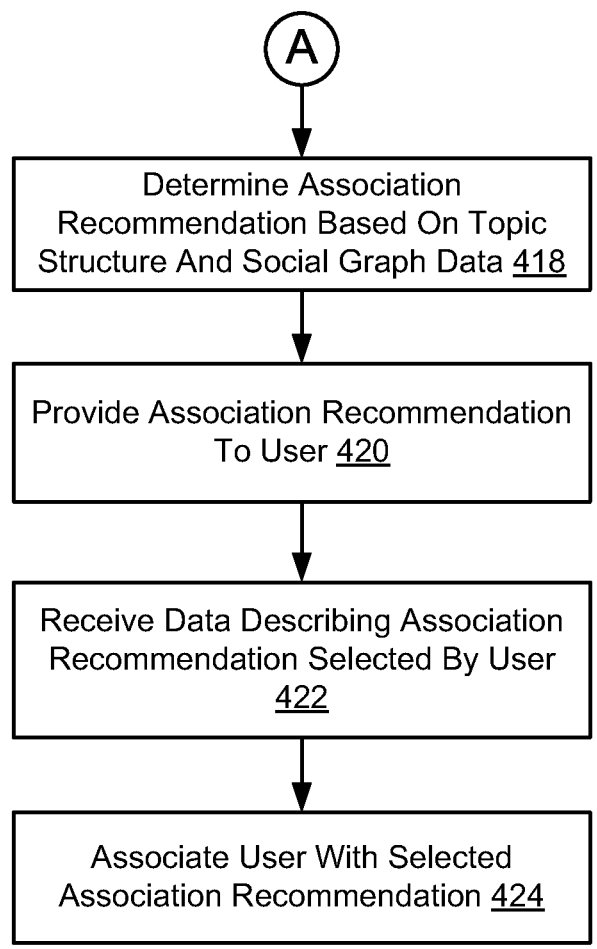

FIGS. 4A and 4B are flowcharts of another example method 400 for providing one or more association recommendations to users. Referring to FIG. 4A, the controller 202 receives 402 a request to disassociate with a topic from a user. The identification module 204 identifies 404 one or more keywords associated with the topic. The identification module 204 identifies 406 one or more entity representations associated with the topic based on a knowledge graph. The identification module 204 identifies 408 label data describing one or more labels associated with the topic. The identification module 204 determines 410 a confidence score for each label. The structure module 206 determines 412 a topic structure associated with the topic. Optionally, the controller 202 retrieves 414 social graph data associated with the user from the social network server 101. Optionally, the recommendation module 208 determines 416 a preliminary set of association recommendations based on the social graph data.

Referring to FIG. 4B, the recommendation module 208 determines 418 one or more association recommendations for the user based on the topic structure and the social graph data. The recommendation module 208 provides 420 the one or more association recommendations to the user. Optionally, the controller 202 receives 422 data describing an association recommendation selected by the user. The association module 210 associates 424 the user with the selected association recommendation.

Figure 5A:
Figure 5D:

FIGS. 5A-5D are graphic representations 500, 520, 540, 560 of example user interfaces for providing association recommendations to a user. Referring to FIG. 5A, the example association recommendations include one or more tags, one or more topics and one or more communities associated with a topic Rock Music. Referring to FIG. 5B, the example association recommendations include one or more tags associated with the topic Rock Music. Referring to FIG. 5C, the example association recommendations include one or more recommended topics associated with the topic Rock Music (e.g., more precise topics than the topic Rock Music). Referring to FIG. 5D, the example association recommendations include one or more communities associated with the topic Rock Music.

FIG. 6 is a graphic representation 600 of an example user interface illustrating an example topic-interest graph. The example topic-interest graph includes a first topic 602, a second topic 604 and one or more users associated with at least one of the first topic 602 and the second topic 604. For example, User 1, User 2, User 3 and User 4 subscribe to the first topic 602, and User 1, User 3 and User 5 subscribe to the second topic 604. In some examples, the connections between the first topic 602 and User 1, User 2, User 3 and User 4 indicate that User 1, User 2, User 3 and User 4 share a common interest described by the first topic 602. The connections between the second topic 604 and User 1, User 3 and User 5 indicate that User 1, User 3 and User 5 share a common interest described by the second topic 604.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein.

This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
  receiving a request to disassociate with a first topic from a first user;
  identifying one or more entity representations associated with the first topic;
  retrieving data describing content items associated with the first topic;
  identifying an existing label, an estimated label and one or more refined topics associated with the first topic;
  determining a first occurrence pattern for the existing label based on a first number of the content items that are associated with the first topic and are marked with the existing label;
  determining a second occurrence pattern for the estimated label based on a second number of the content items that are associated with the first topic and are estimated to be associated with the estimated label;
  identifying a plurality of second users that connects the first user in a social graph and also shares the first topic as a common interest with the first user;
  determining an association pattern for the first topic based on how the identified plurality of second users associate or disassociate with the first topic;
  determining a topic structure that includes one or more from the group of: the existing label, the estimated label, the one or more refined topics, the one or more entity representations, one or more keywords, one or more confidence scores for one or more labels and one or more links to one or more associated objects; and
  determining an association recommendation relevant to the first user from the one or more refined topics, the first occurrence pattern and the second occurrence pattern based on the determined association pattern and the determined topic structure.

2. The method of claim 1, wherein the first user and the plurality of second users are connected in a topic-interest graph.

3. The method of claim 1, wherein determining the association recommendation comprises:
  determining a preliminary set of association recommendations based on social graph data; and determining the association recommendation from the preliminary set of association recommendations.

4. The method of claim 1, further comprising:
receiving data describing a selection of the association recommendation from the first user; and
creating an association between the first user and the association recommendation.

5. A system comprising:
a processor; and
a memory storing instructions that, when executed, cause the system to:
  receive a request to disassociate with a first topic from a first user;
  identify one or more entity representations associated with the first topic;
  retrieve data describing content items associated with the first topic;
  identify an existing label, an estimated label and one or more refined topics associated with the first topic;
  determine a first occurrence pattern for the existing label based on a first number of the content items that are associated with the first topic and are marked with the existing label;
  determine a second occurrence pattern for the estimated label based on a second number of the content items that are associated with the first topic and are estimated to be associated with the estimated label;
  identify a plurality of second users that connects the first user in a social graph and also shares the first topic as a common interest with the first user;
  determine an association pattern for the first topic based on how the identified plurality of second users associate or disassociate with the first topic;
  determine a topic structure that includes one or more from the group of: the existing label, the estimated label, the one or more refined topics, the one or more entity representations, one or more keywords, one or more confidence scores for one or more labels and one or more links to one or more associated objects; and
  determine an association recommendation relevant to the first user from the one or more refined topics, the first occurrence pattern and the second occurrence pattern based on the determined association pattern and the determined topic structure.

6. The system of claim 5, wherein the first user and the plurality of second users are connected in a topic-interest graph.

7. The system of claim 5, wherein the instructions when executed cause the system to determine the association recommendation by:
determining a preliminary set of association recommendations based on social graph data; and
determining the association recommendation from the preliminary set of association recommendations.

8. The system of claim 5, wherein the instructions when executed cause the system to also:
receive data describing a selection of the association recommendation from the first user; and
create an association between the first user and the association recommendation.

9. A computer program product comprising a computer usable medium including a non-transitory computer readable program, wherein the computer readable program when executed on a computer causes the computer to:
  receive a request to disassociate with a first topic from a first user;
  identifying one or more entity representations associated with the first topic;
  retrieve data describing content items associated with the first topic;
  identify an existing label, an estimated label and one or more refined topics associated with the first topic;
  determine a first occurrence pattern for the existing label based on a first number of the content items that are associated with the first topic and are marked with the existing label;
  determine a second occurrence pattern for the estimated label based on a second number of the content items that are associated with the first topic and are estimated to be associated with the estimated label;
  identify a plurality of second users that connects the first user in a social graph and also shares the first topic as a common interest with the first user;
  determine an association pattern for the first topic based on how the identified plurality of second users associate or disassociate with the first topic;
  determine a topic structure that includes one or more from the group of: the existing label, the estimated label, the one or more refined topics, the one or more entity representations, one or more keywords, one or more confidence scores for one or more labels and one or more links to one or more associated objects; and
  determine an association recommendation relevant to the first user from the one or more refined topics, the first occurrence pattern and the second occurrence pattern based on the determined association pattern and the determined topic structure.

10. The computer program product of claim 9, wherein the first user and the plurality of second users are connected in a topic-interest graph.

11. The computer program product of claim 9, wherein determining the association recommendation comprises:
determining a preliminary set of association recommendations based on social graph data; and
determining the association recommendation from the preliminary set of association recommendations.

* * * * *